April 1, 1952     S. A. KRAFT ET AL     2,591,363
HYDRAULIC TRANSMISSION
Filed Dec. 27, 1948     8 Sheets-Sheet 1

Fig. 1

Inventor
Arthur W. Beaurline
Selmer A. Kraft
By Robert M. Dunning

Inventor
Arthur W. Beaurline
Selmer A. Kraft
By Robert M. Dunning

Fig. 5

Patented Apr. 1, 1952

2,591,363

UNITED STATES PATENT OFFICE 2,591,363

HYDRAULIC TRANSMISSION

Selmer A. Kraft, St. Paul, Minn., and Arthur W. Beaurline, River Forest, Ill., assignors to Johnson Power-On Transmission Corporation, Chicago, Ill., a corporation of Illinois Application December 27, 1948, Serial No. 67,502

13 Claims. (Cl. 74—687)

Our invention relates to an improvement in hydraulic transmission wherein a planetary gear system between a drive shaft and a driven shaft is controlled by rotary hydraulic units.

It is an object of the present invention to provide a transmission embodying a planetary gear system embodying a rotary hydraulic motor and a rotary hydraulic pump. The motor is connected to the gear carrier of the planetary system, the pump is connected to the sun gear of the planetary system and the drive shaft is connected to the ring gear of the planetary system. By varying the fluid connections between the hydraulic motor and the pump, various gear ratios between the drive shaft and the driven shaft may be obtained.

It is a feature of the present invention to provide a hydraulic system connected to a planetary gear system and involving a rotary hydraulic motor and a rotary pump each having a plurality of inlets and outlets. A valve element is associated with the two rotary hydraulic units so that the inlets and outlets of each unit may be connected either in series or in parallel. By varying the connection between the two hydraulic units the relative speed between the units may be varied, thus producing different relative speeds between the drive shaft and the driven shaft.

A feature of the present invention lies in the manner of controlling the flow of fluid between the hydraulic motor and the hydraulic pump. By varying the type of fluid connection between these elements the relative speeds of the two units may be varied, thus changing the relative speed between the drive shaft and the driven shaft by acting upon the planetary gear system.

These and other objects and novel features of our invention will be more clearly and fully set forth in the following specification and claims.

In the drawings forming a part of our specification.

Figure 1:
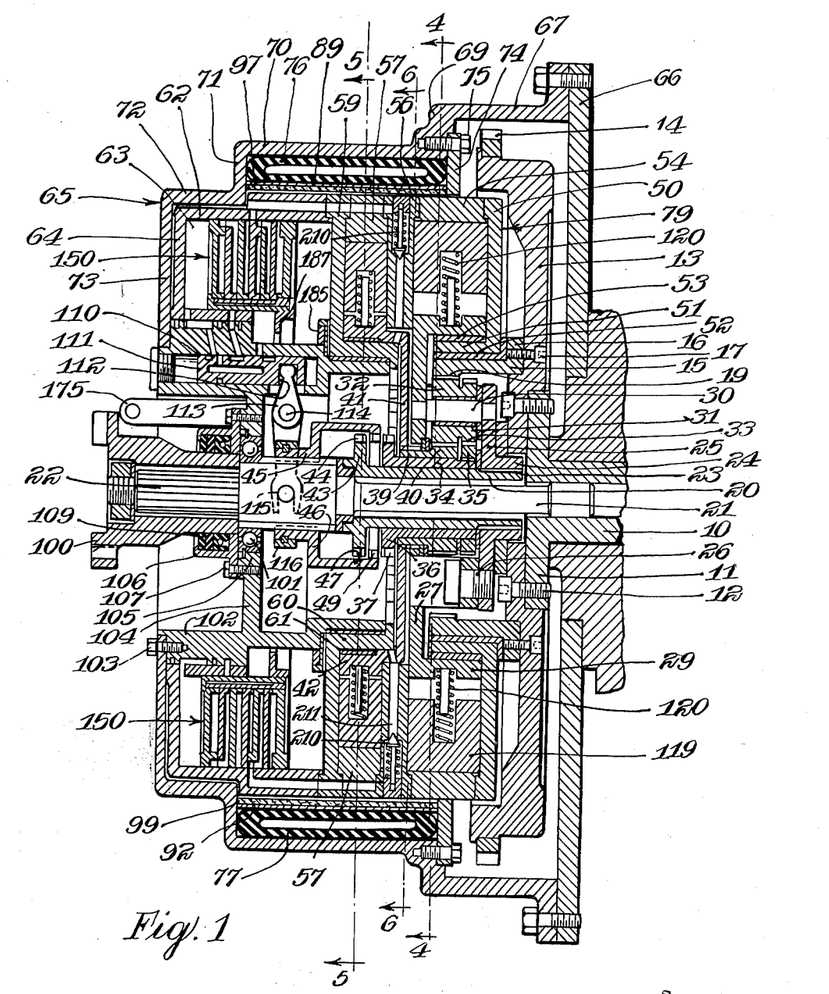
Figure 1 is a sectional view through our transmission showing the general construction thereof.

The drive shaft 10 is provided with a flange 11 on its extremity which is bolted at 12 to the engine fly wheel 13. The fly wheel 13 is usually provided with peripheral teeth 14 by means of which the fly wheel may be engaged by the vehicle starting motor. A ring gear sleeve 15 is provided with a hub 16 secured to the fly wheel 13 by bolts 17 or other suitable means. The ring gear sleeve 15 is provided with internal ring gear teeth 19. Thus the ring gear 19 is connected to the drive shaft 10 for rotation in unison therewith.

A sleeve 20 freely encircles the reduced diameter end 21 of the driven shaft 22. This sleeve 20 is keyed at 23 to the hub 24 of a ring-like flange 25. The flange 25 is bolted or otherwise connected at 26 to the ring-like flange 27 having a rotor 29 connected thereto. The rotor 29 forms a part of the hydraulic motor which will be later described in detail.

A series of angularly spaced shafts 30 are supported between the flange 25 and the rotor flange 27. Double planet gears 31 are mounted upon these shafts 30. The double planet gears 31 include a larger diameter gear 32 which engages the ring gear 19 and a smaller diameter gear 33. The two gears 32 and 33 are unitarily connected together for rotation in unison.

A sleeve 34 encircles the sleeve 20 and freely rotates about the same. A sun gear 35 is keyed to the sleeve 34 for rotation therewith. A flange 36 is provided on the end of the sleeve 34. Teeth 37 are provided on the flange 36 for a purpose which will be later described.

A sleeve 39 freely encircles the sleeve 34 and is provided with sun gear teeth 40 thereupon. The sun gear teeth 40 are in constant mesh with the large diameter gear 32 of the planet gear 31 while the sun gear teeth 35 on the sleeve 34 are inconstant mesh with the smaller diameter gear 33 of the planet gears 31. The sleeve 39 is keyed or otherwise connected to a disc-like flange 41 which forms a support for a rotor 42 forming a part of a hydraulic pump which will be later described in detail.

The sleeve 20 is provided with a radially extending flange 43 at one end thereof equipped with teeth 44 of similar diameter to and spaced from the teeth 37 of the flange 36. A hub 45 is spline connected to the driven shaft 22 to rotate therewith and to slide longitudinally thereof. A flange 46 on this sleeve 45 supports a sleeve 47 encircling the flange 43 and bearing inwardly projecting teeth 49 which may mesh selectively with either the teeth 37 or the teeth 44. In the position illustrated in Figure 1 of the drawings the teeth 49 are in a neutral position and are connected to neither set of teeth. However, when the hub 45 is moved to the right from the position shown in Figure 1, the teeth 49 will be engaged with the teeth 37 and the sun gear 35 will be operatively connected for rotation with the driven shaft. When the hub 45 is moved to the left from the position shown in Figure 1 of the drawings, the teeth 49 will be operatively engaged with the teeth 44 and the planet gear carrier will be operatively connected to the driven shaft 22.

A motor and pump housing are rotatably supported about the driven shaft 22. This housing includes an end plate 50 having a cylindrical flange or hub 51 which is rotatably supported upon a bearing 52 located outwardly of and encircling the ring gear sleeve 15. A bearing 53 encircles the hub 51 of the ring gear and assists in supporting the cylindrical inner surface of the rotor 29. A ring-like hydraulic motor casing portion 54 is connected in any suitable manner to the flange-like end plate 50 and forms the rotor casing. As will be later described in detail this ring like housing member 54 is provided with a non-concentric inner surface so that the hydraulic motor may function in its intended manner.

A spacing ring 56 forms a closure for the side of the motor chamber opposite to that closed by the end plate 50. This spacing ring 56 acts to space the chambers of the hydraulic motor and the hydraulic pump and this ring is ported in a manner which will be later described, to provide passages through which fluid may flow from the hydraulic motor to the pump and vice versa.

A ring-like pump housing element 57 is connected to the spacing ring 56 to form an enclosure for the pump unit. This ring 57 is provided with a non-concentric surface as will be later described so that the structure may serve in the capacity of a pump. An end closure plate 59 encloses the side of the rotor 42 opposite the side closed by the spacing ring 56 to form an enclosed pump housing.

The end closure plate 59 is provided with a cylindrical flange 60 which extends inwardly of the cylindrical inner surface of the pump rotor 42 and a bearing 61 is mounted between the rotor 42 and the flange 60 to assist in rotatably supporting the rotor. The motor and pump casing also includes a generally cylindrical sleeve 62 which is connected to the end plate 59 and forms a hollow cylindrical valve cylinder chamber 63. The cylindrical sleeve 62 is provided with an integral end closure ring 64 which forms an end in the valve chamber 63.

A fixed housing illustrated in general by the numeral 65 encircles the entire transmission and forms a fixed support for certain non-rotatable parts of the transmission. The casing or housing 65 includes an end plate 66 which encircles the drive shaft 10 and acts to enclose the fly wheel 13. The end plate 66 in usual construction forms an end wall of the motor to which the transmission is attached. The housing 65 includes a relatively large diameter sleeve 67 connected to a somewhat smaller diameter sleeve 70. The sleeve 70 is connected by a ring-like flange or off-set 71 to a still smaller diameter sleeve 72. The end of the sleeve 72 is provided with an end closure ring 73 which encircles the driven shaft.

A ring 74 is connected by bolts 75 to the off-set 69 to extend inwardly into closely spaced relation to the outer periphery of the rotary housing of the motor and pump. The ring 74 and the off-set or flange 71 forms a means of combining a pair of hollow semi-circular expandable tubes 76 and 77. These tubes 76 and 77 form a part of the brake structure by means of which the rotation of the rotary pump and motor housing, which will be described generally by the numeral 79, may be held from rotation relative to the fixed outer casing 65.

Figure 4:
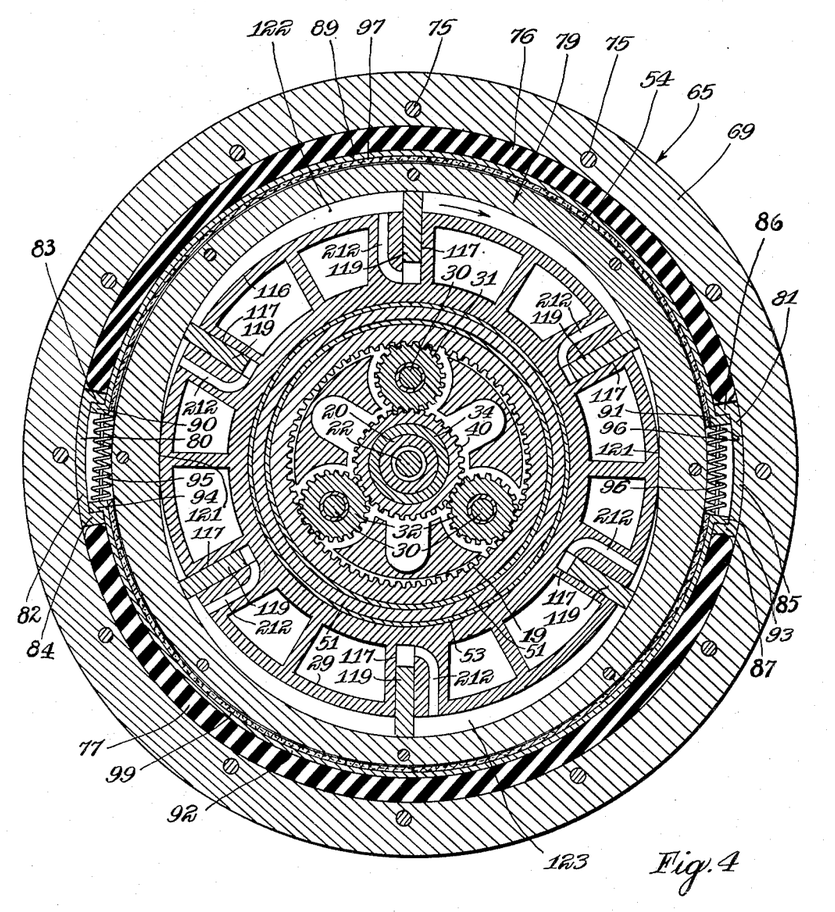
Figure 4 is a sectional view through the transmission, the position of the section being indicated by the line 4—4 of Figure 1.
Figure 5:
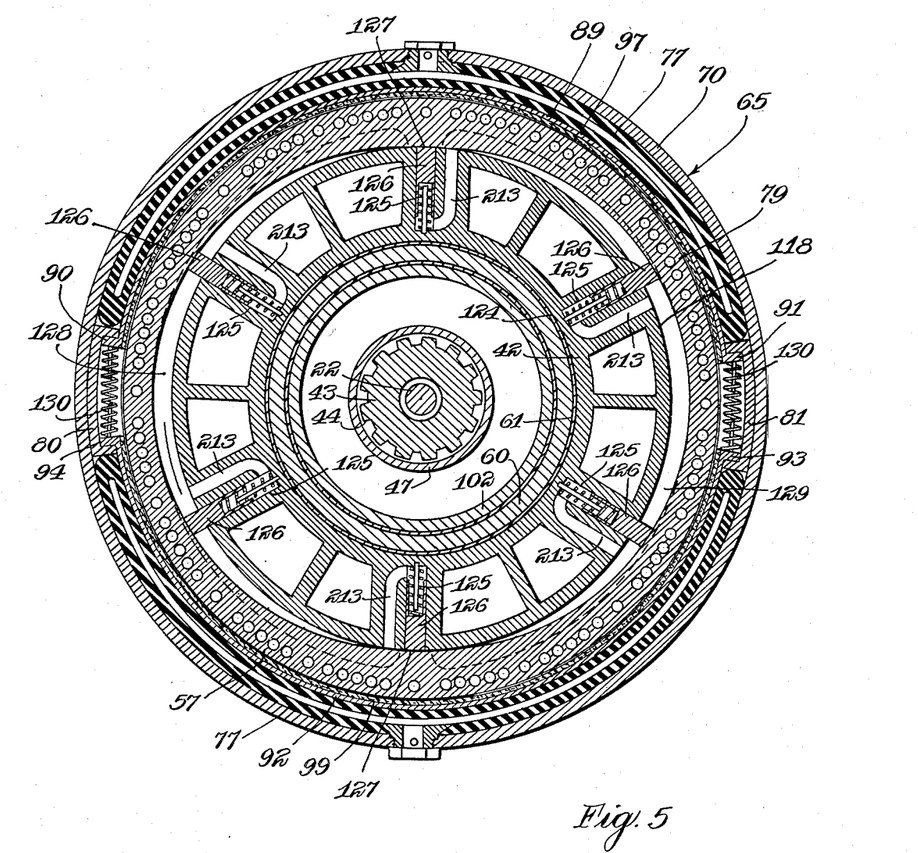
Figure 5 is a sectional view through another portion of the transmission, the position of the section being indicated by the line 5—5 of Figure 1.

As best indicated in Figures 4 and 5 of the drawings a pair of axially extending channels 80 and 81 are secured to the inner surface of the outer housing portion 70 which are at diametrically opposed points thereof. The channel 80 includes an arcuate base 82 and a pair of spaced inwardly projecting end flanges 83 and 84. The channel 81 is like-wise provided with an arcuate base 85 and a pair of inwardly projecting end flanges 86 and 87. The arcuate bases 82 and 85 of these channels are secured in any desired manner to the inner surface of the housing portion 70. A substantially semi-circular brake shoe 89 encircles the cylindrical outer surface of the inner rotary housing 79 and is provided with outwardly projecting lugs 90 and 91 at opposite ends thereof. These lugs 90 and 91 extend into the channels 80 and 81 and are located adjacent the end flanges 83 and 86 thereof.

A similar substantially semi-circular brake shoe 92 is provided with outwardly extending end lugs 93 and 94 which extend into the channels 81 and 80 and engage adjacent the side flanges 87 and 84 thereof respectively. A spring 95 is located between the brake shoe lugs 90 and 94 and a similar spring 96 is located between the legs 86 and 93 to urge these lugs apart.

The brake shoes 89 and 92 are provided with brake lining material 97 and 99 on the inner surface which may be drawn against the outer cylindrical surface of the rotary housing 79. When fluid is introduced to the interior of the expandable tubes 76 and 77 the brake shoes 89 and 92 are urged against the rotatable housing 79 to hold this housing from rotation relative to the outer housing 65.

A universal joint or connection 100 is mounted upon the outer end of the driven shaft 22 and is connected to the shaft for rotation therewith. A ball bearing 101 encircles the driven shaft and acts as a support therefor. The ring-like flange 73 of the outer casing 65 is bolted to an inwardly extending sleeve 102 by bolts 103. The sleeve 102 is provided with an inwardly extending ring flange 104 which supports a hub 105 encircling the outer race of the bearing 101. A bearing retaining flange and sleeve 106 is bolted at 107 to the hub 105. Packing members 109 are interposed between the hub of the universal joint 100 and the fixed bearing retainer sleeve 106 so as to form an oil seal for this end of the transmission.

A cylindrical aperture 110 is provided in the sleeve 102 for accommodation of a slidable valve 111. This valve 111 is provided with a slot 112 therein for accommodation of the outer end of a shifting fork 113. The fork 113 is pivotally connected at 114 to the transmission casing and a bifurcated end of the shifting fork is pivotally connected at 115 to a rotatable sleeve 116 encircling the hub 45. When the shifting fork 113 is pivoted in one direction moving slidable valve 111 the hub 45 is moved to the right, while movement of the slide valve 111 in the opposite direction by the shifting fork 113 moves the hub 45 to the left as viewed in Figure 1.

In Figure 4 of the drawings we disclose the construction of the hydraulic motor previously described. As shown in this figure the rotor 29 is provided with a cylindrical outer surface 116 having a series of angularly spaced radially extending slots 117 therein. These slots 117 are designed to accommodate radially slidable vanes 119. In the particular form of construction illustrated six such vanes are provided in equally spaced relation about the periphery of the rotor 29. The vanes 119 are normally urged outwardly by springs 120 illustrated in Figure 1 of the drawings.

Figures 6, 7:
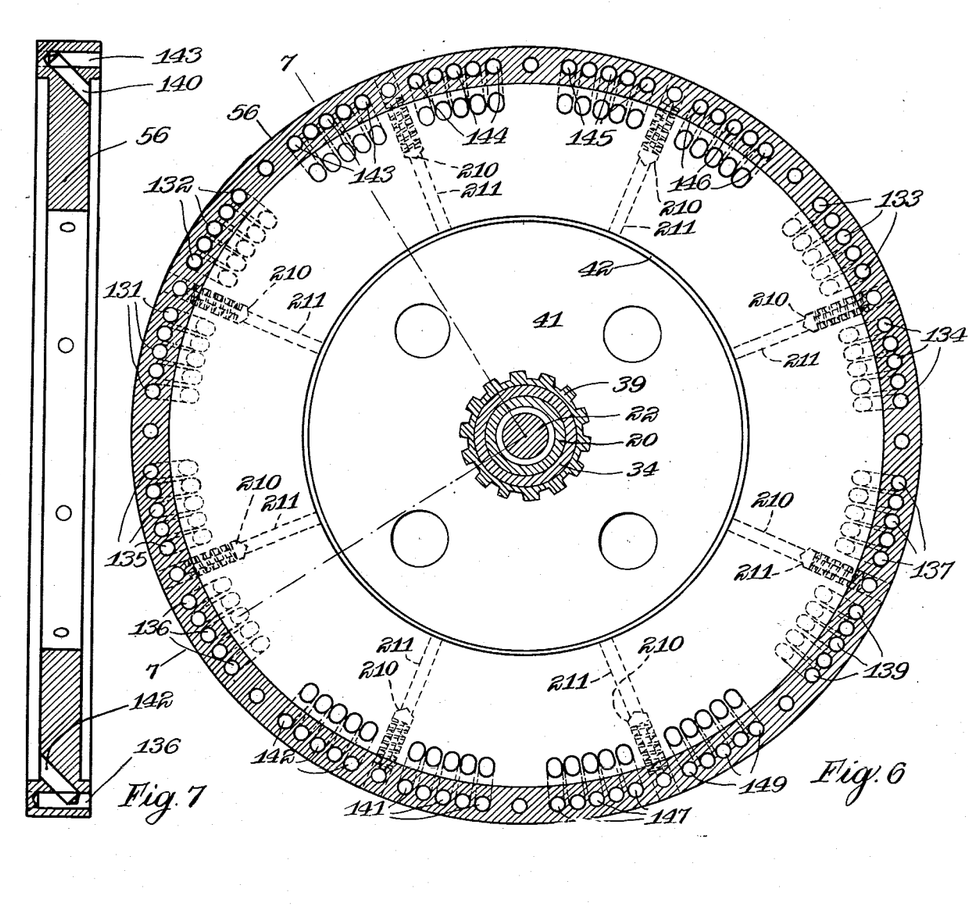
Figure 6 is an end view of the ring shaped port structure between the hydraulic motor and the hydraulic pump.
Figure 7 is a sectional view through the element illustrated in Figure 6.

It should also be noted that the motor housing portion 54 is not concentric with the cylindrical outer surface of the rotor, but is provided with two opposed portions 121 which extend into substantial contact with the outer surface 116 of the rotor. Between these close fitting areas 121 the inner surface of the motor housing 54 curves outwardly so as to provide motor chambers 122 and 123 between the outer surface of the rotor and the inner surface of the housing. In the form of construction illustrated the housing curves outwardly for approximately sixty degrees, extends concentric with the rotor axis for approximately sixty degrees and then curves inwardly toward the rotor surface for the next sixty degrees. The vanes 119 slide radially into and out of the slots 117 and are in constant contact with the inner surface of the housing 54. The pump housing is similarly constructed as illustrated in Figure 5 of the drawings. The rotor 42 is provided with a generally cylindrical outer surface 118 concentric with the cylindrical inner surface 124. The rotor 42 is provided with a series of radially extending slots 125 in its outer periphery for the accommodation of radially slidable vanes 126. These vanes 126 may slide into and out of the slots 125 in a radial direction. The pump housing portion 57 is non-concentric and is provided with two opposed portions 127 which are in substantial contact with the outer surface 118 of the rotor. Between these points 127 of substantial contact the housing curves away from the outer surface of the rotor to provide pump chambers 128 and 129 between the rotor and the pump housing. The inner housing surface curves outwardly from the points 127 for approximately sixty degrees, extends substantially concentric with the rotor for the next sixty degrees and then curves toward the point of substantial contact for the third sixty degrees. Springs such as 125 normally urge the vanes 126 outwardly into contact with the inner surface of the housing. It will be noted that the points of substantial contact 121 between the motor rotor and the housing are at substantially right angles to the points 127 of substantial contact between the pump rotor and its housing. Passages or ports are provided in the partition ring 56 through which fluid may flow to and from the motor chambers 122 and the pump chambers 128 and 129. The arrangement of these passages is best illustrated in Figures 6 and 7 of the drawings. The various passages extend into communication with longitudinally extending passages through the rotatable housing 79 to the valve cylinder portion 62 thereof. These passages are shown in Figure 5 of the drawings.

In the operation of the transmission it is desirable to control the flow of fluid from the fluid motor to the pump and vice versa. As will be later described, in some instances it is desirable that the fluid from each motor chamber 122 be directed to a corresponding pump chamber 128 and 129. In other instances it is desirable to confine the flow of fluid from both rotor chambers 122 and to direct all of the fluid into a single pump chamber 128 or 129. In order to control the flow of fluid ports are provided near the inlet end and near the outlet end of each of the pump chambers and each of the motor chambers. Suitable valve means are provided within the valve cylinder portion 62 of the housing for controlling the flow of fluid. The fluid in the motor chamber 122 may pass through two series of ports 131 and 132 at one end of the chamber and may pass through two series of ports 133 and 134 at the other end of the chamber. Fluid in the chamber 123 may flow through the ports 135 and 136 near one end of the chamber and through ports 137 and 139 near the opposite end of the chamber. All of these ports are constructed as best illustrated in Figure 7 of the drawings, the ports extending partially through the spacing ring 56 for communicating with the inclined passage portion 140 which leads into the motor chambers at the points illustrated.

A similar series of ports are provided leading into the pump chambers 128 and 129. Two series of ports 141 and 142 are provided at one end of the pump chamber 128 and a second series of ports 143 and 144 are provided near the opposite end of the chamber 128. Two sets of ports 145 and 146 lead into the pump chamber 129 near one end thereof and a second series of ports 147 and 149 lead into the pump chamber 129 at the opposite end of the pump chamber. All of the ports mentioned communicate with longitudinally extending passages through the housing portions 57, 59, and 62 and lead into the valve cylinder where the flow through the various passages may be controlled.

With reference now to Figures 8 through 13 of the drawings the manner of controlling the flow of fluid from the motor to the pump and vice versa will be explained. The motor rotor 29 and the pump rotor 42 are shown connected by a valve illustrated diagrammatically at 150. The motor chambers 122 and 123 are shown connected to the pump chambers 128 and 129 through the valve 150, the passages through which the fluid flows being indicated diagrammatically by lines.

Figure 8:
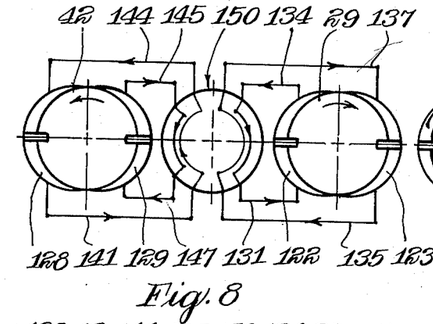
Figure 8 is a diagrammatic view showing the direction of flow of fluid through the hydraulic pump motor and valve when the transmission is in neutral.

In Figure 8 of the drawings is illustrated the position of the valve 150 when the transmission is in neutral. It will be noted that as the motor rotor 29 rotates in a clockwise direction fluid is forced from the motor chamber 122 through ports 134 to the valve 150 and is allowed to flow through the valve 150 to ports 131 leading to the inlet of the chamber 122. Similarly fluid is forced from the outlet ports 135 of the chamber 123 to the valve 150 and through this valve the fluid may flow through the inlet ports 137 to the motor chamber 123. Thus fluid from the outlet ports of each motor chamber is merely circulated to the inlet ports of these same chambers and the motor has no action upon the pump 42.

It will similarly be noted that the fluid in the pump chamber 128 may flow through the outlet ports 141 of the chamber 128 to the valve 150 which allows the fluid to return through ports 144 to the inlet end of the chamber 128. The fluid in the chamber 129 is forced through outlet ports 145 to the valve 150 and the valve permits the return of fluid through the inlet ports 147 at the opposite end of the chamber 129. Thus the pump may rotate freely merely circulating fluid from the chamber outlets to the chamber inlets. The pump 42 always rotates in a counter-clockwise direction while the motor 29 always rotates in a clockwise direction.

Figure 9:
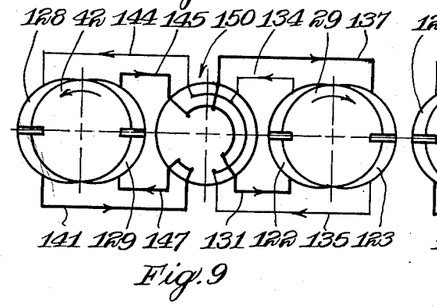
Figure 9 is a view similar to Figure 8 showing the fluid flow when the transmission is in first forward speed.

When it is desired to move the driven shaft in a forward direction at relatively low speed, the valve 150 is actuated to control the fluid as best illustrated in Figure 9 of the drawings. As indicated in this figure, fluid from the motor 29 is forced through outlet ports 134 to the valve 150. Fluid from the motor chamber 123 is forced through the outlet ports 135 to the valve 150 and combines with the outlet flow from the chamber 122. This fluid is forced through the inlet ports 144 to the inlet end of the pump chamber 128. The outlet end of the pump chamber 128 is provided with outlet ports 141 which direct fluid to the valve 150. The valve 150 directs the outlet fluid from the pump chamber 128 into the inlet ports 147 of the pump chamber 129. The outlet ports 145 of the pump chamber 129 direct fluid to the valve 150, which divides this outlet fluid and directs it through inlet ports 131 and 137 leading to the inlet ends of the motor chambers 122 and 123.

Figure 10:
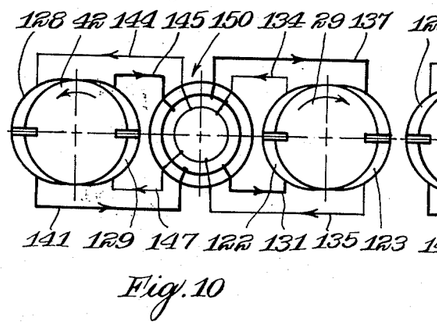
Figure 10 is a view similar to Figure 8 showing the fluid flow when the transmission is in second forward gear.

When it is desired to move the driven shaft at a higher rate of speed relative to the drive shaft, the valve 150 is operated to the position best indicated in Figure 10 of the drawings. When arranged in the manner shown in this figure, the rotation of the motor rotor 29 tends to force fluid from the motor chamber 122 through the outlet ports 134 to the valve and also forces fluid from the chamber 123 through the outlet ports 135 to the valve 150. The combined fluid is directed by the valve 150 to the inlet ports 147 of the pump chamber 129 and also to the inlet ports 144 of the pump chamber 128. The fluid from the pump chamber passes through the outlet port 141 of the chamber 128 and the outlet ports 145 of the chamber 129 and is directed by the valve 150 to the inlet ports 131 of the motor chamber 122 and through ports 137 to the inlet end of the motor chamber 123.

Figure 11:
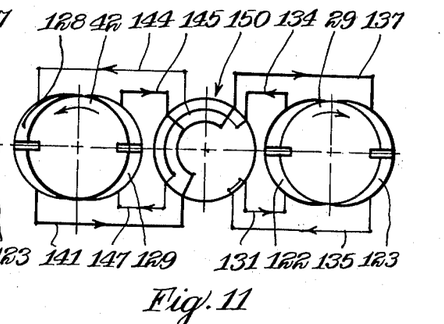
Figure 11 is a diagrammatic view showing the fluid flow when the transmission is in third speed or in reverse.

When it is desired to move the driven shaft at a still higher speed relative to the drive shaft the valve 150 is operated to connect the inlet and outlet ports in the manner best illustrated in Figure 11 of the drawings. When arranged in this manner the fluid from the motor chamber 122 is forced through the outlet ports 134 to the valve 150 and this fluid is directed through the inlet ports 144 and 147 to the inlet ends of the pump chambers 128 and 129. The outlet ends of these pump chambers are connected by outlet ports 141 and 145 to the valve 150 and the combined fluid from both pump chambers 128 and 129 is directed to the inlet port 137 of the motor chamber 123. The outlet port 135 of the motor chamber 123 forces fluid to the valve 150 and this fluid is directed back through the inlet ports 131 to the motor chamber 122.

Figure 12:
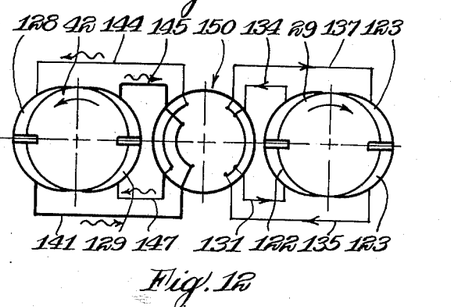
Figure 12 is a diagrammatic view showing the fluid flow when the transmission is in fourth forward speed.

When it is desired to move the driven shaft at a still higher rate of speed relative to the drive shaft the valve 150 controls the fluid as indicated in Figure 12 of the drawings. Fluid is forced from the motor chamber 122 through the outlet ports 134 to the valve 150. The valve 150 directs the fluid to the inlet port 131 of the motor chamber 122, thus allowing the fluid to circulate from the outlet ports of the chamber 122 to the inlet ports thereof. Similarly the fluid in the chamber 123 is directed through the outlet ports 135 to the valve 150 and through the inlet ports 137 back into the chamber 123, thus allowing the free circulation of fluid from the outlet of the chamber 123 to the inlet ports thereof. When the valve 150 is arranged as indicated in Figure 12 the outlet ports 141 of the pump chamber 128 are connected to the outlet ports 145 of the pump chamber 129 and the inlet port 144 of the pump chamber 128 is connected to the inlet ports 147 of the chamber 129. Thus the pressure forwardly of the vanes in the pump chambers halts rotation of the pump rotor 42 and locks the rotor for rotation with the chamber. Ports 131, 134, 135 and 137 are connected.

Figure 13:
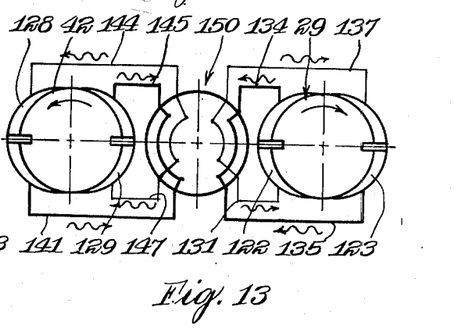
Figure 13 is a diagrammatic view showing the fluid flow when the transmission is in fifth forward speed.

When it is desired to rotate the driven shaft at still a higher speed relative to the drive shaft, the valve 150 is arranged as indicated in Figure 13 of the drawings. When the valve 150 is in this position the outlet port 134 of the motor chamber 122 is connected through the valve 150 to the outlet port 135 of the chamber 123 and the inlet port 131 of the chamber 122 is connected to the inlet port 137 of the motor chamber 123. Similarly the outlet port 141 of the chamber 128 is connected to the outlet port 145 of the pump chamber 129 and the inlet port 144 of the pump chamber 128 is connected to the inlet port 147 of the pump chamber 129. Thus the pressure forwardly of the vanes of both the pump and the motor lock the rotors from rotation and both the pump and the motor rotate with their enclosing casings.

From the foregoing description it will be obvious that when the transmission is in neutral fluid is allowed to circulate within the motor and also within the pump and each of these elements can rotate freely. If it is remembered that the drive shaft is connected to the ring gear and the motor rotor 29 is connected to the planet gear carrier for movement therewith and that the pump rotor 42 is mounted for rotation with the sun gear it will be noted that rotation of the ring gear will merely cause a rotation of the motor in one direction and a rotation of the pump in the opposite direction. Furthermore as the gear carrier or the sun gear is operatively connected for rotation with the driven shaft and if either of these elements is held stationary by engagement with the driven shaft, the other element will merely rotate at a greater rate of speed. Thus while the valve 150 is in the neutral position illustrated in Figure 8 of the drawings the teeth 49 mounted for rotation with the driven shaft 22 may be connected either to the teeth 37 rotatable with the sun gear or the teeth 44 rotatable with the planet gear carrier without causing rotation of the driven shaft. If the driven shaft 22 is connected for rotation with the sun gear 35 the sun gear will merely remain stationary and the planet gear carrier will travel at a greater rate of speed. Similarly if the driven shaft 22 is connected to the planet gear carrier, this carrier may remain stationary and the speed of rotation of the sun gears will be increased.

If the valve 150 is placed into the position illustrated in Figure 9 of the drawings the free circulation of fluid within the motor and the pump is prevented. When the valve 150 is placed in the position shown in Figure 9 by the shifting fork 113, it operates to engage the driven shaft with the planet gear carrier which also rotates with the motor rotor 29. Rotation of the pump rotor 42 forces fluid into the inlet ports 131 and 137 of the motor chambers, tending to rotate the motor in a clockwise direction. The fluid from the motor chambers is directed to the inlet of one pump chamber 128. Thus the motor rotor rotates at a relatively low speed as the motor chambers are considerably larger than the pump chambers and as the fluid from a single pump chamber is all of the fluid directed to the inlets of the motor chambers. From a different view point it will be seen that all of the fluid from both chambers of the motor is combined and directed into a single chamber of the pump allowing the pump to rotate at a high rate of speed relative to the motor and therefore driving the driven shaft which rotates in unison with the motor at a relatively low speed.

When the valve 150 is placed into the position illustrated in Figure 10 of the drawings the relative speed of the pump is decreased and the speed of the motor is increased. When arranged as illustrated in Figure 10 the fluid pumping from both of the motor chambers 122 and 123 is directed to both of the pump chambers 128 and 129 so that if the pump and the motor were of the same size the pump would be rotated at the same speed as the motor. However, because of the fact that the pump is only approximately one-half the width of the motor the speed of the pump will be greater than that of the motor. The rotor of the motor still remains connected to the driven shaft in this arrangement.

With the rotor of the motor still connected to the driven shaft the valve 150 is placed in the position shown in Figure 11 of the drawings in order to increase the relative speed of the driven shaft. When arranged as illustrated in this figure, the outlet ports of one motor chamber 122 are connected through the valve to both inlet ports of the pump. In other words the fluid pumped from one chamber of the motor is directed to both chambers of the pump, thereby reducing the speed of the pump relative to the motor and correspondingly increasing the speed of the motor. The fluid pumping from the other chamber of the motor merely circulates into the inlet port of the first mentioned motor chamber and both chambers of the motor thus arranged in series while the pump chambers are arranged in parallel.

With the rotor of the motor still connected to the driven shaft and the valve arranged as indicated in Figure 12 of the drawings the pump is stopped from rotation, thereby causing rotation of the motor at a greater relative speed. When the pump rotor is held from rotation with respect to its casing, thereby holding the forward sun gear from rotation relative to the casing the planet gear carrier rotates forwardly at an increased rate of speed.

During the previously described actions the rotatable casing 79 is held from rotation with respect to the outer casing by fluid pressure within the expandable tubes 76 and 77. Thus in the previously described speeds the casing may be considered as stationary, while the pump and rotors rotate therein. When the valve 150 is placed into the position illustrated in Figure 13 of the drawings both the pump and the motor are held from rotation relative to the rotatable casing and the planet gear system can not function. Accordingly when moving from the valve position shown in Figure 12 to the valve position shown in Figure 13 the pressure is released from within the expandable tubes 76 and 77 allowing the casing 79 to rotate freely relative to the outer casing. If both the motor rotor and the pump rotor are locked to the casing, rotation of the drive shaft causes the entire inner casing and all of the mechanism therein to rotate in unison as a body, thereby rotating the driven shaft at the same speed as the drive shaft.

The manner in which the various forward speeds may be obtained has been described in detail. All of the speeds are accomplished by merely controlling the valve 150 and the pressure within the expandable tubes 76 and 77. All of the forward speeds are obtained while the driven shaft is connected for rotation with the planet gear carrier. The specific mechanism for operating the valve 150 and the specific construction of this valve is not believed of importance in the present invention. In actual practice the valve 150 slides axially within the valve housing 62 and acts to connect the ends of the various passages described which communicate with the interior of the pump chambers and the interior of the motor chambers. The slide valve is provided with suitable connecting grooves in its surface and passages through its body to produce a communication between the various passages. The valve may be operated manually or may be operated automatically by any suitable controlling apparatus.

When it is desired to provide a reverse rotation of the driven shaft 22 relative to the drive shaft, the shifting fork 113 is pivoted to operate the valve 111 and to slide the hub 45 longitudinally of the driven shaft so as to connect the teeth 49 with the teeth 37 on the flange 36 of the sleeve 34 keyed to the reverse sun gear 35. The reverse sun gear 35 is in constant mesh with the gear 33 of the duplex planet gears 31. This shifting action locks the reverse sun gear 35 for rotation in unison with the driven shaft 22.

When the reverse sun gear 35 is connected for rotation with the driven shaft from the central neutral position illustrated in Figure 1, the valve 150 is placed into the position illustrated in Figure 11 of the drawings. When in this position the motor rotor 29 forces fluid from its outlet port 134 to both inlet ports of the two pump chambers. As a result the motor can travel at a fairly high rate of speed relative to the pump rotor 42.

Rotation of the ring gear 19 then causes a forward rotation of the planet gear carrier and a reverse rotation of the pump rotor 42 and the speed of rotation of the pump rotor 42 is low relative to the speed of the motor as fluid from a single motor chamber is being directed to both of the pump chambers. Rotation of the pump rotor in a reverse direction causes rotation of the sun gear 32 and also of the sun gear 35, as both of these sun gears are in mesh with portions of the same duplex gear. Rotation of the sun gear 35 in a reverse direction drives the driven shaft to which it is connected in a reverse direction.

Figure 14:
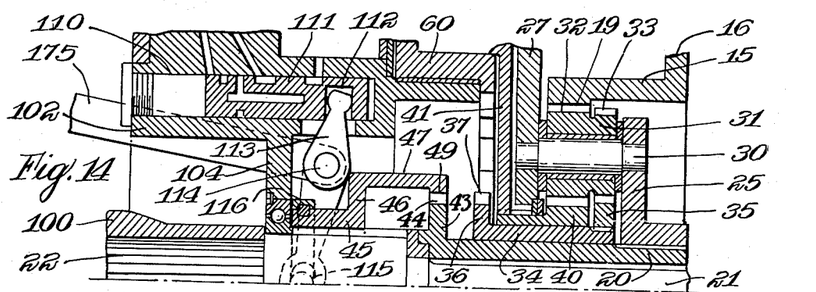
Figure 14 is a sectional view through a portion of the transmission showing the driven gear connected to an alternate sun gear when the transmission is in reverse.
Figure 15:
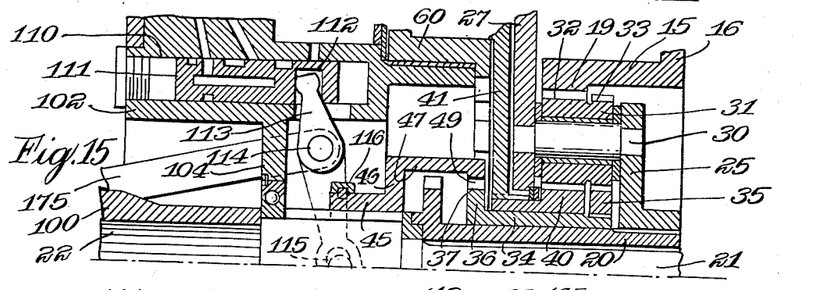
Figure 15 is a view similar to Figure 14 showing the driven gear connected to the planet gear carrier.

In Figures 14 and 15 of the drawings we disclose the manner in which the shifting fork 113 moves the hub 45 and selectively connects either of two sets of teeth with the driven shaft. In Figure 15 of the drawings the driven shaft is shown connected through the hub 45, the flange 46, the sleeve 47 and the internal teeth 49 with the gear teeth 37 on the end flange 36 of the sleeve 34 to which the reverse sun gear 35 is keyed. In Figure 14 of the drawings this same shifting fork 113 is shown connecting the driven shaft 22 to the teeth 44 on the end flange 43 of the sleeve 20 to which the hub 24 of the planet gear carrier 25 is keyed.

Figure 16:
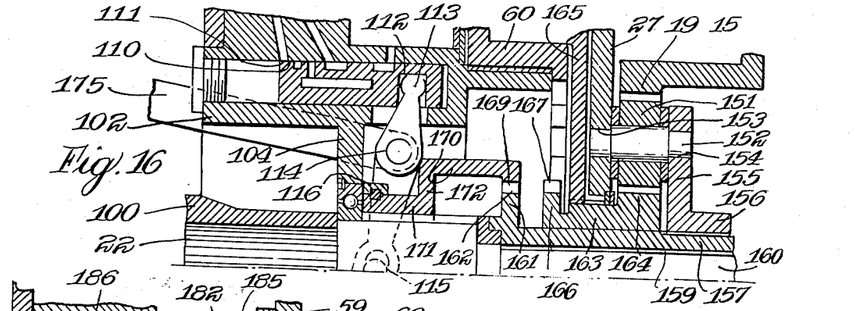
Figure 16 is a view similar to Figures 14 and 15 showing an alternate form of construction.

In Figure 16 of the drawings we disclose a modified form of construction in which the reverse sun gear 35 is eliminated and a single planet gear 151 corresponding to the gear 32 of the duplex planet gear 31 is substituted therefor. The planet gear 151 is supported by a suitable shaft 152 supported on bearings 153 and 154 on opposite sides of the planet gear carrier. The planet gear carrier includes an end plate 155 substantially identical to the end plate 25 and having a hub 156 keyed to a sleeve 157 supported upon a bearing 159 encircling the reduced diameter end 160 of the driven shaft. The hub 156 is keyed to the sleeve 157 and this sleeve is provided with an end flange 161 having peripheral teeth 162 thereupon. In this form of construction a sleeve 163 encircles the sleeve 157 and supports a sun gear 164 in constant mesh with the planet gear 151. A flange 165 having a hub 166 is keyed to the sleeve 163. The flange 165 corresponds to the flange 41 of the previously described construction and is connected to the rotor 42 of the pump.

External teeth 167 are provided on the hub 166 in spaced relation to the teeth 162 of the flange 161 and the two sets of teeth are of equal diameter. Either set of teeth is selectively engageable with the internal teeth 169 on the sleeve 170 connected to the splined hub 171 by a circular flange 172. The splined hub 171 is identical to the previously described hub 45 and is spline connected to the driven shaft 173. Thus in the construction illustrated in Figure 16 the rotor of the pump may be directly connected to the driven shaft and the duplex planet gear arrangement is eliminated. When the driven shaft is connected to the planet gear carrier the transmission operates exactly in the manner previously described.

The manner in which the transmission is shifted from forward speed to neutral and reverse has been described insofar as the internal mechanism is concerned, but the manner of accomplishing this result has not been stated. In Figures 1 and 14 through 16 of the drawings it will be noted that the shifting fork 113 is connected to rotate with a lever 175 which extends from one end of the transmission casing 65 and which may be moved by any suitable device. Figure 14 of the drawings shows the lever in position for driving the driven shaft 22 forwardly while in Figure 15 of the drawings the lever is shown in position to drive the transmission in reverse. Mid-way between these positions in the central position shown in Figure 1 of the drawings the shifting fork holds the transmission in neutral.

Figure 17:
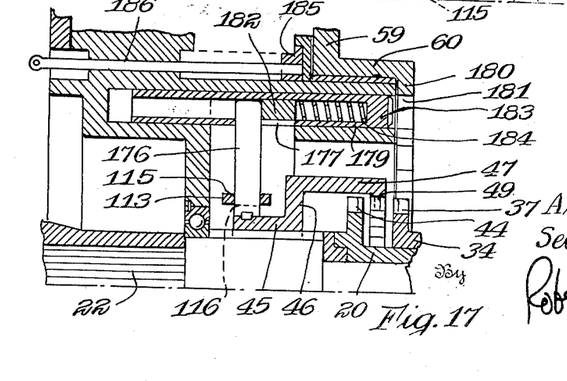
Figure 17 is a sectional view through a portion of our transmission showing a detail of the construction thereof.

Figure 17 illustrates a detail of construction not specifically illustrated in any of the other drawings. This figure is a sectional view through the pivotal connection 115 between the shifting fork 113 and the ring shaped sleeve 116, the section being taken at right angles to Figure 1 on a horizontal plane through the shafts. The pivotal connection 115 is formed between the end of the shifting fork 113 and a pair of oppositely directed pivot pins 176 on the sleeve 116. The pivot pins 176 extend laterally from the sleeve 116 through the slotted lower end of the shifting fork 113 and extend into a cavity 177 of a slidable locking plunger 179. The plunger 179 is reciprocated by movement of the shifting fork 113 so as to move the locking plunger 179 to the right or to the left from the center position shown in Figure 17.

The flange 60 integral with the end closure plate 59 is provided with an inwardly projecting flange 180 having angularly spaced notches or teeth 181 along its inner surface. The plunger 179 in one extreme position engages between the teeth 181 so as to lock the sleeve 116 from rotation relative to the rotatable casing 79. As the shifting forks 113 are pivotally supported on a fixed portion of the stationary outer casing 65 and as the plunger 179 is similarly slidable in a fixed portion of the stationary casing, the engagement of the plunger 179 with the teeth 181 definitely holds the inner rotatable casing from movement relative to the outer casing, thereby insuring the interlocking of these parts when the transmission is in reverse gear.

The interlocking of the rotatable portion of the casing with the stationary portion thereof is of value in maintaining the driven shaft gear connected to the drive shaft during periods when the engine of the vehicle is not in operation. During the time the vehicle engine is in operation and the transmission is not rotating the driven shaft at a relatively high rate of speed, the expandable members 76 and 77 lock the rotatable inner casing 79 from rotation relative to the fixed casing 65. However, in the event the pressure within the expandable members 76 and 77 should drop the inner casing will be allowed to rotate. In order to prevent accidental movement of the inner casing relative to the outer casing, the plunger 179 engages in the notches or teeth 181 forming a lock between these elements. During this relative movement the transmission must be in reverse gear. During all of the time when the transmission is in reverse gear, the expandable members are presumably expanded so that the plungers 179 do not change the operation in this respect.

It will be noted that the plungers 179 are hollow and include an inner slidable plunger element 184 is interposed between the plunger element 182 and the closed plunger end 183. Thus, if ment 182, which is movable toward the closed forward end 183 of the plunger 179. A spring during movement of the shifting forks 113 into reverse position, the plunger 183 engages one of the teeth 181, movement of the pins 176 will merely compress the springs 184 and create a pressure upon the plunger, urging the same against the engaged tooth 181. In the event the rotatable inner casing 79 shall rotate slightly relative to the plunger 179 the plunger will engage between the teeth and hold the two elements from further relative rotation.

Our transmission also includes means for controlling the valve mechanism 150 manually, although the specific detail of the control valve is not illustrated. A slidable ring 185 encircles the sleeve 102 within one end of the valve chamber 63 and is movable axially toward and away from the end closure wall 73 of the transmission. A pair of diametrically opposed rods 186 are threadably engaged at one end into the ring 185 as shown in Figure 17 of the drawings and these rods 186 on opposite sides of the driven shaft extend through the end wall 73 of the transmission. The ring 185 may be moved into engagement with the flange 187 to move the valve elements to the left from the position illustrated in Figure 1 of the drawings. By controlling the movement of the ring 185 the speed ratio of the transmission may be regulated.

Figure 2:
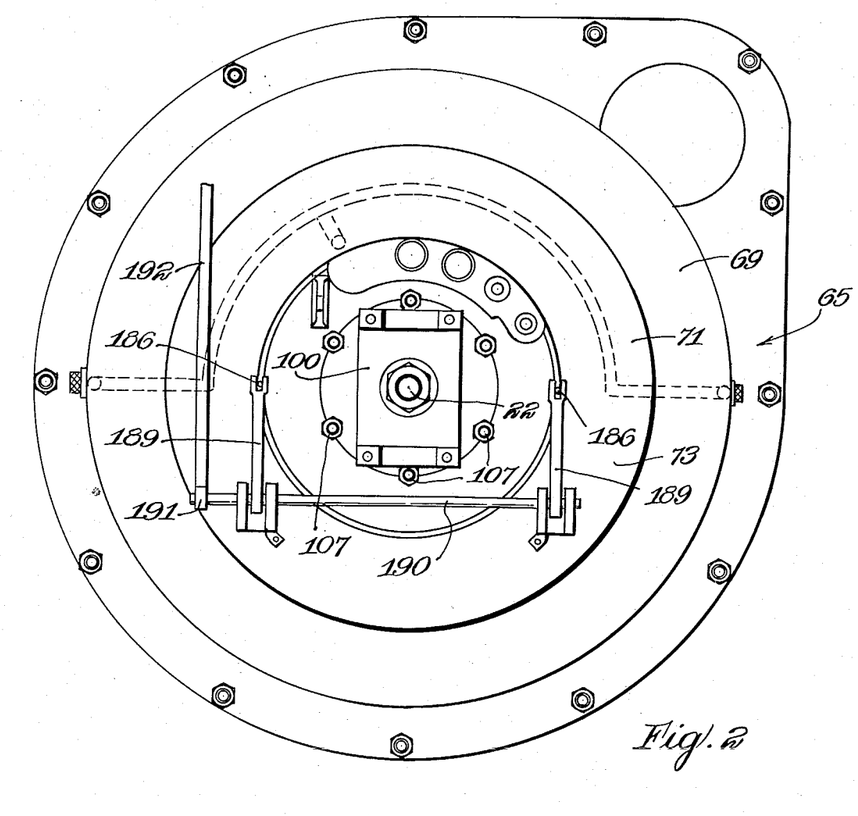
Figure 2 is an end elevational view of the transmission.
Figure 3:
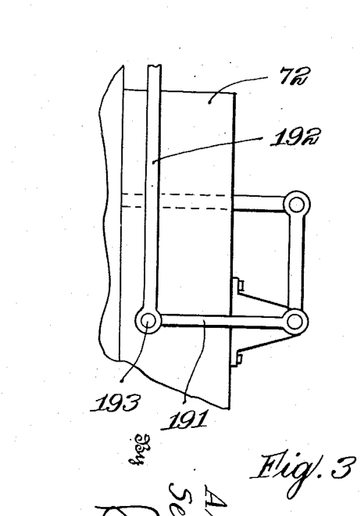
Figure 3 is a side elevational view of the end of the transmission shown in Figure 2.

In Figures 2 and 3 of the drawings we disclose the rods 186 extending through one end of the transmission and pivotally and slidably connected between the bifurcated ends of crank arms 189. The crank arms 189 are mounted on a common shaft 190 which is actuated by means of a link 191 shown in Figure 3 of the drawings. The link 191 is oscillated by any suitable means such as by the operating arm 192 pivoted to the arm 191 at 193.

Figure 18:
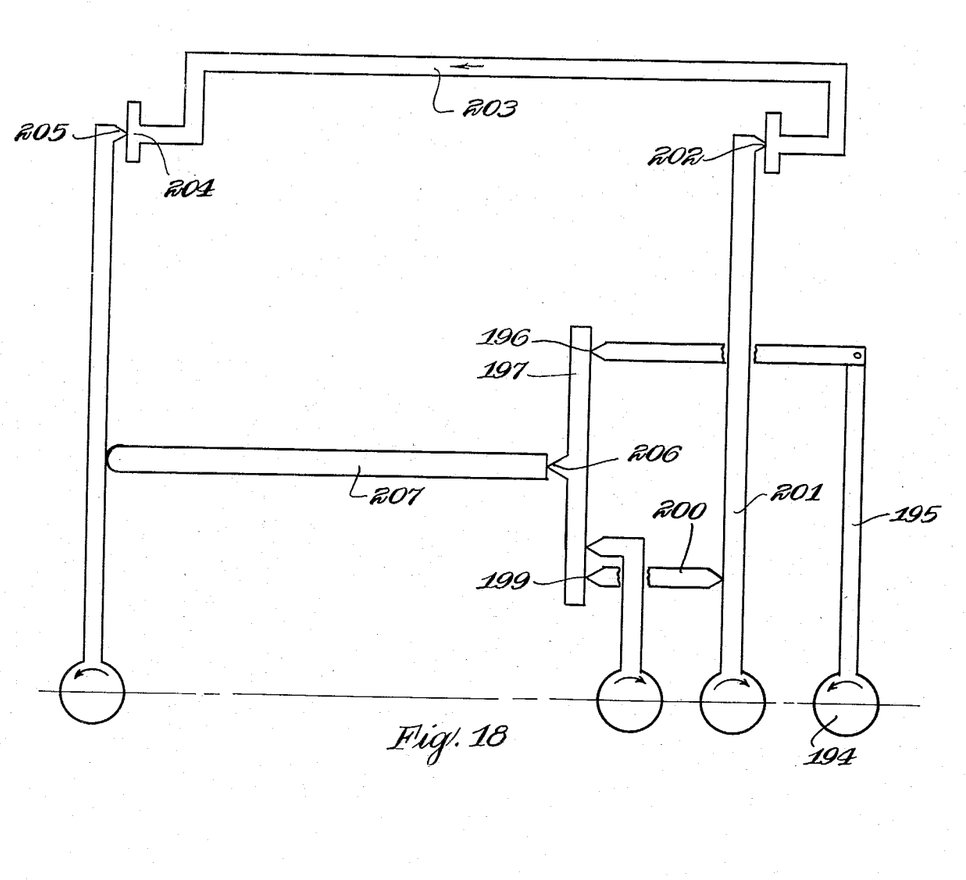
Figure 18 is a diagrammatic view of the torque relation of the parts of the transmission.

In Figure 18 of the drawings we have illustrated a diagram which is intended to illustrate the manner in which the hydraulic connection between the so-called motor and the pump assists the mechanical drive between the drive shaft and the driven shaft to produce increased power. This diagram is only intended for the purpose of illustration and is only diagrammatic of the effects obtained in the operation of our transmission.

The drive shaft is indicated at 194 and is shown acting upon a lever arm 195 which produces a force at the point 196 corresponding to the force exerted at the radius of the ring gear 19. If the engine is capable of producing 1200 pounds torque at a point one inch from the axis of the drive shaft and if the ring gear is at a radius of 2.4 inches from the axis, there will be 500 inch pounds acting at point 196 against the outer extremity of the planet gear, which is indicated by the lever 197. Considering the opposite sides of the planet gears to produce equal force, there will be 500 pounds pressure exerted against the point 199 which represents the point of engagement between the planet gear 197 and the sun gear. The sun gear is indicated by the link 200 and transfers 500 pounds pressure against the arm 201 which represents the hydraulic pump. 500 pounds pressure is exerted at a distance of approximately 1.1 inches from the axis of the hydraulic pump while the mean radius of the hydraulic pump may be considered to be 5¼ inches.

As a result 105 pounds pressure is exerted at point 202 which may be considered the mean radius of the pump.

If the pump vanes are of an area of .40 square inch 260 pounds per square inch pressure will be exerted against the fluid. This pressure is transmitted through the conduit 203 to the interior of the hydraulic motor 204. The area of the vanes of the motor is approximately .7 square inch so that the force exerted against the vanes would be considerably greater than the force acting against the vanes in the pump at 202.

The forces acting on opposite sides of the planet gears or against the ends of the lever 197 both equal 500 pounds. The force acting against the axis of the planet gears or against the planet gear carrier 207 will be the sum of these forces or 1,000 pounds. This in turn is multiplied by the radius of the planet gear axes, which in the present example is 1¾. Accordingly 1,750 inch pounds is exerted against the planet gear carrier, tending to rotate the driven shaft in the manner illustrated in the diagram. In other words, 1,750 inch pounds is the torque factor of the gear drive between the drive shaft and the driven shaft.

In the first three speeds of the transmission both the gear drive and the action of the hydraulic forces must be taken into consideration. In first speed the pump is arranged in series and the motor chambers are connected in parallel. Therefore the area of the fluid motor at 204 becomes twice the area of a single vane or 1.4 square inches. Thus the pressure of 260 pounds per square inch developed by the pump at 202 becomes 365 inch pounds, acting at 204. This pressure multiplied by the 5¼ inch radius of the point 204 gives 1,920 inch pounds which is added to the 1,750 inch pounds delivered by the gear drive between the drive shaft and the driven shaft. This totals 3,670 inch pounds or 306 foot pounds of torque available for driving in first speed.

When the transmission is in second speed the pump and motor are both connected in parallel so that the 105 inch pounds delivered at the point 202 produces 130 pounds per square inch in the conduit 203 and 183 inch pounds at the point 204. This figure multiplied by the radius of 5¼ inches gives 960 inch pounds through the hydraulic system, which added to the 1,750 inch pounds delivered by the gear system, totals 2,710 inch pounds or 266 foot pounds of torque available for driving purposes in second speed.

In third speed the pump is connected in parallel and the motor is connected in series. Thus the 130 pounds per square inch developed by the pump in conduit 230 produces 91.5 inch pounds at point 204 which multiplied by the radius of the force equals 480 inch pounds added to the 1,750 inch pounds delivered by the gear system. This totals 2,230 inch pounds or 186 foot pounds of torque available for driving purposes.

The hydraulic system is of no effect in fourth speed and the 1,750 inch pounds delivered by the gears is the total torque available. 1,750 inch pounds amounts to 146 foot pounds of torque.

In fifth speed the transmission rotates in a unit with the crank shaft in a ratio of one to one. Therefore the 1,200 inch pounds delivered at the drive shaft would produce a similar amount to the driven shaft or 100 foot pounds of torque.

In the case of reverse, the situation as it appears in first speed repeats itself with the introduction of a small undetermined variable that appears in a diminishing form in the gear box after the load has been transferred through the hydraulic system. The torque actually delivered in reverse is slightly greater than the 306 foot pounds developed in first speed.

It will be noted that in the transmission formed as described, by merely varying the connection between the hydraulic motor and the hydraulic pump a number of different combinations of pressure can be developed. The two chambers in the pump can be connected either in series or parallel, as can also the two chambers in the motor. Obviously if the motor and pump were provided with three separate angularly spaced chambers instead of the two illustrated, a still greater variation in pressure could be obtained by the control valve, such a construction following the pattern described.

As indicated in Figure 1 of the drawings and as also indicated in Figure 6, valves 210 are provided at the ends of radially extending passages 211 through the partition member 56. These valves are spring urged into closed position, but are provided for the purpose of replenishing oil in the system between the two rotor chambers upon the escape of oil therefrom. The interior of the transmission is filled with oil or other hydraulic fluid and the oil constantly tends to open the valves 210. As oil escapes from the system between the two rotor chambers, the pressure of oil within the system will act to open the valves and to take the place of any oil which has leaked from the system.

An examination of Figure 4 of the drawings will illustrate that passages 212 are provided between the pumping chambers outwardly of the rotor 29 and the area at the base of the vanes 119. This communication 212 provides fluid under pressure at the base of the vanes so as to equalize any force tending to hold them in retracted position. A similar series of passages 213 are provided in the rotor 42 so that pressure at opposite ends of the vanes 126 may be equalized.

In accordance with the patent statutes, we have described the principles of construction and operation of our hydraulic transmission, and while we have endeavored to set forth the best embodiments thereof, we desire to have it understood that these are only illustrative thereof, and that obvious changes may be made within the scope of the following claims without departing from the spirit of our invention.

We claim:

1. A transmission including a drive shaft, a planetary gear system including a ring gear connected to said drive shaft for rotation therewith, a planet gear carrier, a planet gear in mesh with said ring gear supported by said planet gear carrier, a sun gear in mesh with said planet gear, a vaned pump rotor connected to said sun gear for rotation in unison therewith, a casing encircling said rotor and including a plurality of pump pockets through which said vanes pass, a second rotor connected to said planet gear carrier, a second casing rotatable with the first named casing and encircling said second rotor, means selectively operable for restraining the pump casings from rotation, a plurality of pockets in said second casing, vanes on said second rotor and passing through said spaced pockets, passages connecting said pockets in the first named casing with the pockets of the second named casing, rotation of the first named rotor acting to force liquid from said first casing through said passages and into said second casing and to cause rotation of said second rotor, and clutch means connecting said planet gear carrier to said driven shaft.

2. The structure described in claim 1 and including valve means in said passages.

3. The structure described in claim 1 and including valve means in said passage for connecting the pockets of the first named chamber in series in which the fluid passing the first pump casing passes through all the pockets therein, or in parallel in which the fluid passing through the first pump casing passes through a single pocket therein.

4. The structure described in claim 1 including valve means in said passages for connecting the pockets in said second casing in series in which the fluid passing the first pump casing passes through all the pockets therein, or in parallel in which the fluid passing through the first pump casing passes through a single pocket therein.

5. The structure described in claim 1 including valve means in said passages, said valve means acting to connect the pockets of each of said casings selectively in series in which the fluid passing the first pump casing passes through all the pockets therein, or in parallel in which the fluid passing through the first pump casing passes through a single pocket therein.

6. The structure described in claim 1 and including a second planet gear rotatable with said first mentioned planet gear, a second sun gear engaged with said second planet gear, said clutch means selectively connecting said planet gear carrier to said driven shaft or connecting said second sun gear for rotation in unison with said driven shaft.

7. A transmission including a drive shaft, a planetary gear system including a ring gear concentric with said drive shaft and rotatable in conjunction therewith, a planet gear carrier coaxial with said drive shaft and relatively rotatable with respect thereto, a planet gear rotatably supported by said gear carrier, a sun gear concentric with said ring gear and in mesh with said planet gear, a rotor casing connected to said sun gear for rotation in unison therewith, angularly spaced vanes on said rotor, a pump casing encircling said rotor and including a plurality of angularly spaced pumping chambers, a second rotor connected to said planet gear carrier for rotation in unison therewith, angularly spaced vanes supported by said second rotor, a second casing encircling said second rotor, said second casing including angularly spaced pumping chambers, means operable for restraining said pump casings from rotation, passages connecting said pumping chambers of the first named casing and of said second casing, valve means in said passages, a driven shaft, and means connecting said planet gear carrier to said driven shaft.

8. The structure described in claim 7 in which the casings are connected together for rotation in unison.

9. The structure described in claim 7 in which the valve means includes means for connecting the pump chambers of the first named casing in series in which all fluid passing through the first named casing passes through all pump chambers sequentially, or in parallel in which all fluid passing through the first named casing passes through a single pump chamber therein.

10. The structure described in claim 7 in which the valve includes means for connecting the pump chambers of the second casing in series in which all fluid passing through the second pump casing passes through all pump chambers sequentially, or in parallel in which all fluid passing through the second pump casing passes through a single pump chamber therein.

11. The structure described in claim 7 in which the valve means includes means for connecting the pumping chambers of the first named casing and said second casing in parallel in which all fluid passing through a casing passes through a single pump chamber therein, or in series in which all fluid passing through a casing passes through all pump chambers sequentially.

12. The structure described in claim 7 in which the means connecting the planet gear carrier to the driven shaft comprises a clutch.

13. A transmission including a drive shaft, a planetary gear system including a ring gear connected to said drive shaft for rotation therewith, a planet gear carrier, planet gears supported by said carrier and a sun gear in mesh with said planet gears, a vaned rotor connected to said sun gear for rotation in unison therewith, a pump casing within which said rotor rotates, a series of angularly spaced pumping cavities in said casing, a second vaned rotor connected to said planet gear carrier for rotation in unison therewith, a second pump casing within which said second rotor is supported, a plurality of angularly spaced pumping cavities in said second rotor casing about said second rotor, passages connecting the cavities of the first named pump casing to the pump cavities in the second named pump casing, and valve means interposed in said passages, a driven shaft, means connecting said planet gear carrier with said driven shaft, and means operable for holding said pump casings from rotation.

SELMER A. KRAFT.
ARTHUR W. BEAURLINE.

REFERENCES CITED

The following references are of record in the file of this patent:

UNITED STATES PATENTS

| Number | Name | Date |
|---|---|---|
| 1,333,012 | De Puydt et al. | Mar. 9, 1920 |
| 1,552,023 | Wingquist | Sept. 1, 1925 |
| 1,977,033 | Adams | Oct. 16, 1934 |
| 1,998,922 | Chamberlin et al. | Apr. 23, 1935 |
| 2,060,220 | Kennedy | Nov. 10, 1936 |
| 2,086,535 | Centervall | July 13, 1937 |
| 2,126,662 | Ramsey | Aug. 9, 1938 |
| 2,152,622 | Szekely | Mar. 28, 1939 |
| 2,171,146 | Montelins | Aug. 29, 1939 |
| 2,198,891 | Thoma | Apr. 30, 1940 |
| 2,220,174 | Ravigneaux | Nov. 5, 1940 |
| 2,222,144 | Ferris | Nov. 19, 1940 |
| 2,285,431 | Grossenbacher | June 9, 1942 |
| 2,296,929 | Ifield | Sept. 29, 1942 |
| 2,362,542 | De Lancey | Nov. 14, 1944 |
| 2,366,388 | Crosby | Jan. 2, 1945 |
| 2,390,240 | De Lancey | Dec. 4, 1945 |
| 2,415,885 | Johnson et al. | Feb. 18, 1947 |

FOREIGN PATENTS

| Number | Country | Date |
|---|---|---|
| 532,752 | Great Britain | Jan. 30, 1941 |
| 570,589 | Great Britain | July 13, 1945 |